United States Patent
Liu et al.

(10) Patent No.: US 10,039,178 B2
(45) Date of Patent: Jul. 31, 2018

(54) FAILURE EVENT DETECTION IN A PLASMA ARC TORCH

(75) Inventors: Qinghua Liu, Etna, NH (US); Zheng Duan, Hanover, NH (US); Zhang Yu, West Lebanon, NH (US)

(73) Assignee: Hypertherm, Inc., Hanover, NH (US)

( * ) Notice: Subject to any disclaimer, the term of this patent is extended or adjusted under 35 U.S.C. 154(b) by 342 days.

(21) Appl. No.: 13/183,907

(22) Filed: Jul. 15, 2011

(65) Prior Publication Data

US 2012/0234803 A1  Sep. 20, 2012

Related U.S. Application Data

(60) Provisional application No. 61/365,095, filed on Jul. 16, 2010.

(51) Int. Cl.
*B23K 10/00* (2006.01)
*H05H 1/34* (2006.01)

(52) U.S. Cl.
CPC ............. *H05H 1/34* (2013.01); *B23K 10/006* (2013.01); *H05H 2001/3494* (2013.01)

(58) Field of Classification Search
CPC .... B23K 10/006; B23K 9/095; B23K 9/0953; B23K 9/0956; H05H 1/34; H05H 2001/3494; H05H 1/36
USPC ............... 219/121.54, 121.59, 121.5, 121.46
See application file for complete search history.

(56) References Cited

U.S. PATENT DOCUMENTS

| | | | |
|---|---|---|---|
| 4,035,603 A | | 7/1977 | Fernicola |
| 4,203,022 A | * | 5/1980 | Couch et al. ............ 219/121.56 |
| 4,721,947 A | * | 1/1988 | Brown ........................ 340/540 |
| 5,183,990 A | * | 2/1993 | Enyedy .................... 219/121.54 |
| 5,449,877 A | * | 9/1995 | Buda et al. .................. 219/110 |
| 5,521,354 A | * | 5/1996 | Ludewig et al. ........ 219/130.01 |
| 5,717,187 A | * | 2/1998 | Rogozinski et al. .... 219/121.54 |
| 5,750,957 A | * | 5/1998 | Kilty et al. ............... 219/130.1 |
| 5,756,960 A | * | 5/1998 | Rogozinski et al. .... 219/121.54 |
| 5,756,967 A | * | 5/1998 | Quinn et al. ............. 219/130.21 |

(Continued)

FOREIGN PATENT DOCUMENTS

| | | |
|---|---|---|
| CN | 1226003 | 8/1999 |
| CN | 1354062 | 6/2002 |

(Continued)

OTHER PUBLICATIONS

International Search Report for PCT/US2011/044176, dated Nov. 15, 2011, 13 pages.
European Search Report from co-pending European Patent Application No. 11 760 590.7-1551 dated Jul. 5, 2014, 8 pages.

(Continued)

*Primary Examiner* — David Angwin
*Assistant Examiner* — John J Norton
(74) *Attorney, Agent, or Firm* — Proskauer Rose LLP

(57) ABSTRACT

A method of determining a failure event of consumable for a plasma torch is provided. The method includes monitoring at least one of an operating current or an operating voltage during a transfer arc mode of the plasma arc torch. The method also includes determining when at least one parameter associated with the operating current or the operating voltage exceeds a tolerance threshold for a time period indicative of the failure event. The method further includes shutting off at least one of the operating current or the operating voltage of the plasma arc torch when the at least one parameter exceeds the tolerance threshold for the time period.

18 Claims, 14 Drawing Sheets

(56) References Cited

U.S. PATENT DOCUMENTS

| | | | |
|---|---|---|---|
| 5,844,196 A * | 12/1998 | Oakley | 219/121.54 |
| 6,084,195 A | 7/2000 | Swaggerty et al. | |
| 6,350,960 B1 * | 2/2002 | Norris | 219/121.54 |
| 6,359,566 B2 | 3/2002 | Kawai | |
| 6,441,342 B1 | 8/2002 | Hsu | |
| 6,696,660 B2 | 2/2004 | Nastasi, Jr. | |
| 6,707,001 B1 * | 3/2004 | Ulrich et al. | 219/130.21 |
| 6,777,638 B2 * | 8/2004 | Nemchinsky | 219/121.57 |
| 6,794,601 B2 | 9/2004 | Norris et al. | |
| 6,992,262 B2 | 1/2006 | Matus et al. | |
| 7,034,244 B2 | 4/2006 | Matus | |
| 7,265,963 B2 | 9/2007 | Hirose | |
| 7,919,728 B2 | 4/2011 | Era et al. | |
| 2004/0182828 A1 * | 9/2004 | Schmidt et al. | 219/99 |
| 2005/0109738 A1 | 5/2005 | Hewett et al. | |
| 2006/0006154 A1 * | 1/2006 | Koike et al. | 219/121.5 |
| 2006/0207979 A1 * | 9/2006 | Daniel | 219/130.01 |
| 2008/0149608 A1 * | 6/2008 | Albrecht | 219/130.1 |
| 2009/0173725 A1 | 7/2009 | Holcomb et al. | |
| 2009/0230098 A1 | 9/2009 | Salsich et al. | |

FOREIGN PATENT DOCUMENTS

| | | |
|---|---|---|
| CN | 101152681 | 4/2008 |
| DE | 132706 A3 | 10/1978 |
| DE | 300003 A1 | 5/1992 |
| DE | 19522538 A1 | 1/1996 |
| DE | 19756445 A1 | 2/1999 |
| DE | 60126390 | 12/2007 |
| EP | 1 206 992 A2 | 5/2002 |
| EP | 1601238 A2 | 11/2005 |
| GB | 1524222 A | 9/1978 |
| JP | S5744469A A | 3/1982 |
| JP | S61-269975 A | 11/1986 |
| JP | H02207972 A | 8/1990 |
| SU | 1660894 | 7/1991 |
| WO | 2001043910 A1 | 6/2001 |

OTHER PUBLICATIONS

Reinhold, Martin; Beitrag zur Qualitatslenkung beim Plasmaschmelzschnei-den, in: Fortschrott-Berichte VDI, Reihe 2 Fertigungstech- nik, Nr. 489, VDI-Verlag, 1998, pp. 111-116.

* cited by examiner

FAILURE EVENT DETECTION IN A PLASMA ARC TORCH

RELATED APPLICATIONS

This application claims the benefit of and priority to U.S. Provisional Application No. 61/365,095, filed Jul. 16, 2010, the entirety of which is hereby incorporated herein by reference.

FIELD OF THE INVENTION

The present invention relates generally to plasma arc torches, and more particularly, to identifying failure events of consumables in a plasma arc torch.

BACKGROUND OF THE INVENTION

Plasma arc torches are widely used in the heating, cutting, gouging and marking of materials. A plasma torch generally includes an electrode, a nozzle having a central exit orifice mounted within a torch body, electrical connections, passages for cooling, and passages for arc control fluids (e.g., plasma gas). Optionally, a swirl ring is employed to control fluid flow patterns in the plasma chamber formed between the electrode and nozzle. In some torches, a retaining cap can be used to maintain the nozzle and/or swirl ring in the plasma arc torch. In operation, the torch produces a plasma arc, which is a constricted jet of an ionized gas with high temperature and high momentum.

Consumables of a plasma arc torch are susceptible to failures. The life of consumables can fluctuate randomly depending on numerous controllable and uncontrollable factors. The ability to detect the end of consumable life or consumable failures can provide many benefits including reducing the need for operator attention by increasing automation opportunities, reducing cutting machine idle time by reducing consumable inspection, increasing effective life of consumables by reducing premature consumable change-out, increasing productivity by reducing possibility of mid-cut consumable failure, and reducing damages to other components caused by a consumable failure.

An exemplary consumable failure occurs when the tip of an electrode of a plasma arc torch, including the emitter of the torch, is molten and blown away as a result of erosion of the hafnium on the electrode. Consequently, the electrode body can no longer hold the tip in place. During this event, the heat load to the torch and the consumables increases dramatically because the arc is now in direct contact with the electrode body, the nozzle, and possibly the shield. Therefore, if the arc is not timely shut off, the heat can damage other torch components, such as the swirl ring, the shield, the retaining cap, and eventually the plasma arc torch itself. In addition to the absence of an emitter in an electrode, other consumable failures include a large loss of consumable material or a plasma arc emitting off of a part of an electrode other than the emitter.

Consumable failures can also occur when incorrect consumables are installed in a plasma arc torch during a torch operation. An exemplary plasma arc torch can be operated at several different current levels, for example, 65 Amps, 85 Amps or 105 Amps. When the plasma arc torch operates at 105 Amps, it requires a higher flow rate than during operation at 65 Amps. Due to the varying cooling flow and/or shield flow rates that are required to operate the plasma arc torch at different current levels, different consumables are needed for operation at each current level. Furthermore, different consumables may be needed when other operating parameters of the torch are adjusted, for example, amperage, material type or application.

SUMMARY OF THE INVENTION

There is a need to develop systems and methods to timely diagnose a consumable failure event and take appropriate actions to prevent damages to other torch components. Such diagnostic and preventive approaches are advantageous because they reduce the overall operating cost of a plasma arc torch. These approaches are also valuable for matching the right consumables with desired torch operations. A failure event (or condition) can refer to an failure, a near failure, a likely failure or a possible failure of the consumable.

In one aspect, a method of determining a failure event of consumable for a plasma torch is provided. The method includes monitoring at least one of an operating current or an operating voltage during a transfer arc mode of the plasma arc torch. The method also includes determining when at least one parameter associated with the operating current or the operating voltage exceeds a tolerance threshold for a time period indicative of the possible failure event. The method further includes shutting off at least one of the operating current or the operating voltage of the plasma arc torch when the at least one parameter exceeds the tolerance threshold for the time period.

In another aspect, a method of operating a plasma arc torch is provided. The method includes determining an operating signal during a transfer arc mode of the plasma arc torch and calculating a noise level associated with the operating signal. The method also includes determining when the noise level exceeds a predetermined threshold for a time period and providing a failure signal when the noise level exceeds the predetermined threshold for the time period.

In another aspect, a plasma torch system is provided. The plasma torch system includes means for determining an operating signal during a transfer arc mode of the plasma arc torch and means for calculating a noise level associated with the operating signal. The plasma torch system also includes means for determining when the noise level exceeds a predetermined threshold for a time period. The plasma torch system further includes means for providing a failure signal when the noise level exceeds the predetermined threshold for the time period. In some embodiments, the plasma torch system further includes a power supply coupled to the means for determining when the noise level exceeds the predetermined threshold for the time period such that the power supply is turned off when the noise level exceeds the predetermined threshold for the time period.

In yet another aspect, a component is provided that includes a computer readable product tangibly embodied in an information carrier, operable on a computer numerical controller (CNC) for use in a plasma torch system. The computer readable product includes information for performing an operation on a workpiece using a plasma arc torch. The information includes instructions such that while performing the operation an operating current of the plasma arc torch is turned off if a noise level associated with an operating signal exceeds a predetermined threshold.

In yet another aspect, a method for detecting a failure event of consumable of a plasma arc system is provided. The plasma arc system has a controller and a plasma arc torch. The method includes monitoring by the controller at least one of an operating current or an arc voltage of the plasma arc torch for the failure event. Monitoring for the possible failure event includes at least one of: monitoring a first parameter associated with an operating current including (a) current amplitude, (b) rate of current change, or (c) current amplitude fluctuation; or monitoring a second parameter associated with an operating voltage including (a) arc voltage amplitude, (b) rate of arc voltage change, or (c) arc voltage amplitude fluctuation. The method further includes providing a failure signal from the controller to the plasma arc system upon detection of the possible failure event.

In yet another aspect, a system for determining a failure event of consumable in a plasma cutting torch is provided. The system includes a plasma torch connected to a plasma system and generates a plasma arc. The plasma torch includes consumable components. The system also includes a programmable device for controlling and monitoring at least one of an operating current or an arc voltage of the plasma torch. The programmable device is adapted to detect the failure event associated with the consumable components and change an operating signal.

In other examples, any of the aspects above can include one or more of the following features. The time period can be about 1.5 milliseconds. The tolerance threshold can be determined based on an output current of the plasma torch. In some embodiments, the tolerance threshold is a current threshold of about 1.0 A if the output current is less than about 45 A. In some embodiments, the tolerance threshold is a current threshold of about 1.25 A if the output current is between about 45 A and about 75 A. In some embodiments, the tolerance threshold is a current threshold of about 1.5 A if the output current is greater than about 75 A. In some embodiments, the tolerance threshold is a voltage threshold of about 3V.

The operating signal can be an operating voltage or an operating current. The parameter associated with the operating current can be current amplitude, rate of current change or current amplitude fluctuation. The parameter associated with the operating voltage can be arc voltage amplitude, rate of arc voltage change or arc voltage amplitude fluctuation.

The failure event can include an absence of an emitter in an electrode, a large loss of consumable material, an arc emitting off of a part of the electrode other than the emitter, or a combination thereof. In addition, the failure event can include installing a wrong consumable for a type of operation of the plasma torch. The type of operation can be a cutting operation, heating operation, a gouging operation or a marking operation.

In some embodiments, to detect the failure event, both a first parameter associated with the operating current and a second parameter associated with the operating voltage need to exceed their respective thresholds for the predetermined time period.

The failure signal can include shutting off an operating current of the plasma arc torch, an audible sound, a visual signal, an electronic signal, changing at least one operating parameter of the plasma arc torch, or a combination thereof.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

Figure 1:
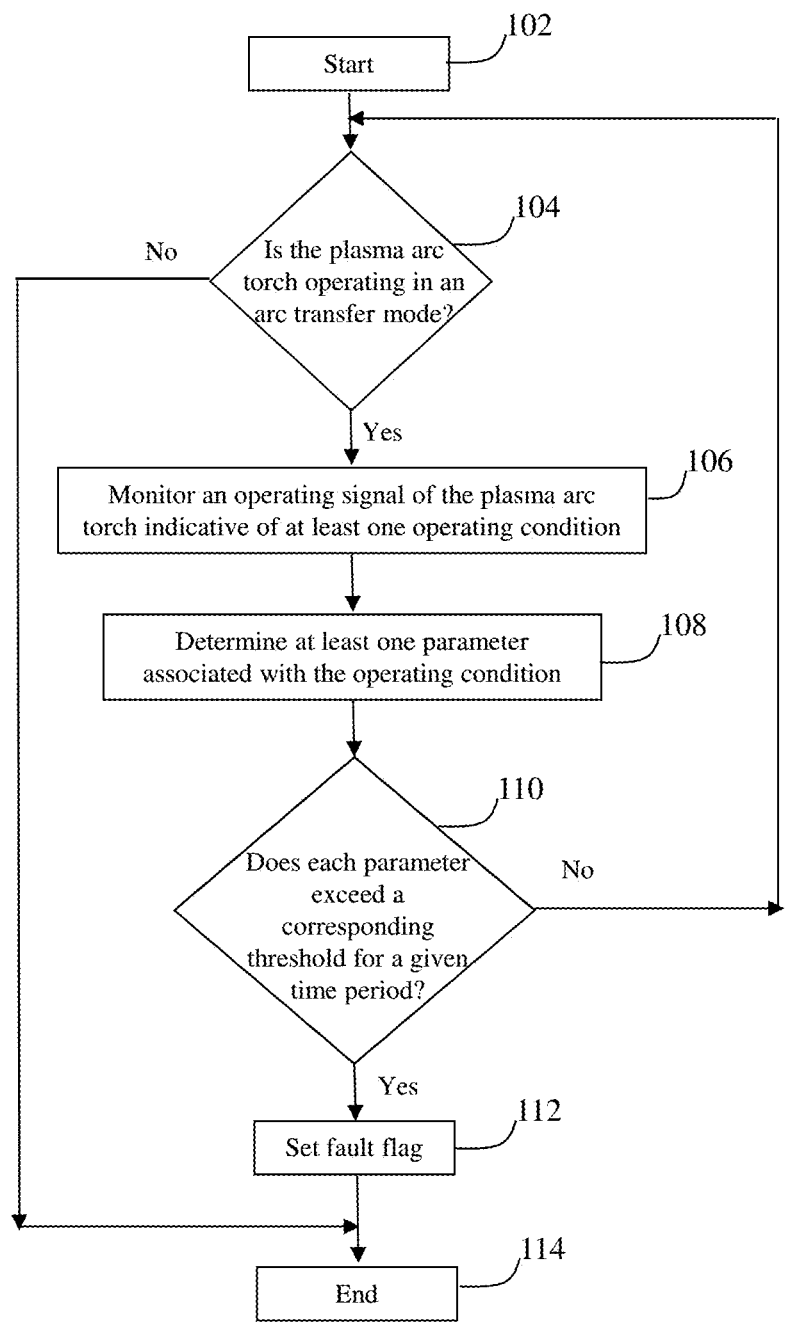
FIG. 1 shows an exemplary process for diagnosing and preventing a consumable failure in a plasma arc torch.

FIG. 1 shows an exemplary process for diagnosing and preventing a consumable failure event (or condition). The process starts (step 102) with the determination of whether a plasma arc torch is operating in an arc transfer mode (step 104). A torch is in an arc transfer mode when it is used to cut, gouge, mark or heat materials, for example. If the plasma arc torch is not in an arc transfer mode, the process ends without updating a fault flag or another indication that notifies an operator of a possible consumable failure for the torch (step 114). In some embodiments, before the start of the process, the fault flag is set to a default value to indicate that no potential consumable failure is detected.

If the plasma arc torch is operating in an arc transfer mode, the process proceeds to monitor one or more operating signals of the torch (step 106). Exemplary operating signals sensed include an operating current and/or an operating voltage of the plasma arc torch. In some embodiments, the one or more operating signals are sensed on a periodic basis, such as every 0.2 milliseconds. The operating signals can be indicative of one or more operating conditions of the torch, including a failure event as described above.

One or more parameters associated with each sensed operating signal are determined (step 108). If the operating signal is an operating current, a parameter associated with the operating signal can be current amplitude, rate of current change or current amplitude fluctuation. If the operating signal is an operating voltage, a parameter associated with the operating signal can be arc voltage amplitude, rate of arc voltage change or arc voltage amplitude fluctuation. In some embodiments, the operating voltage is the nozzle-to-electrode voltage (VNE). In some embodiments, the operating voltage is the nozzle-to-workpiece voltage (VWE). In some embodiments, the parameter is a noise level, i.e., noise magnitude of the operating signal calculated using a digital filter and a digital signal processor (DSP).

After the one or more parameters associated with each operating signal is determined, the process proceeds to determine whether each parameter exceeds a predetermined threshold for a predetermined time period (step 110). If this is true, the fault flag is appropriately set to notify an operator of a possible consumable failure (step 114). In some embodiments, if one parameter of an operating signal exceeds its corresponding threshold for the requisite time period, it is sufficient to set the fault flag. In some embodiments, multiple parameters of the same operating signal need to exceed their respective thresholds for the requisite time period to trigger the failure fault. In some embodiments, one or more parameters of different operating signals need to exceed their respective thresholds for the requisite time period to trigger the failure fault. For example, both the noise magnitude of the operating current and the noise magnitude of the operating voltage may need to exceed their respective thresholds for a predetermined period of time to trigger the failure fault.

In general, the fault detection time period is long enough to ensure that a false positive is not triggered by random noise in the signals, but short enough to prevent damages to other torch components during a consumable failure event. It has been determined that a plasma arc needs to run at least a few seconds during a failure event before damaging other torch components. Hence, the failure detection time period can be set to less than 1 second. For example, the failure detection time period can be about 1.5 milliseconds or about 1 millisecond.

In some embodiments, the failure detection threshold is determined empirically to ensure that the success rate for capturing consumable failure is about 95% or greater and there is zero false alert for consumable failure. In some embodiments, the threshold is dependent on the output current of the plasma arc torch. For example, if the output current is less than about 45 Amps, the operating current threshold is set to about 1.0 Amp. This means that, in the case where the output current of a torch is less than about 45 Amps, if the noise magnitude of the operating current of the torch is consistently greater than about 1.0 Amps for a predetermined period of time, the fault flag is set. In another example, if the output current is between about 45 Amps and about 75 Amps, the operating current threshold is set to about 1.25 Amps. In yet another example, if the output current is greater than about 75 Amps, the operating current threshold is set to about 1.5 Amps.

In some embodiments, the threshold is a voltage threshold of about 3 Volts. Therefore, if the noise magnitude of the output voltage of a torch consistently exceeds 3 Volts for a predetermined period of time, the fault flag is set.

In some embodiments, the current or voltage threshold is dependent on one or more operating parameters of the torch. For example, the current or voltage threshold can be dependent on the parameters associated with one or more filters used to process the current or voltage signals. Specifically, a high-pass filter can be used to filter out the direct-current (DC) and low-frequency components of a signal while preserving the signal's high-frequency component, i.e., noise. In addition, a low-pass filter can be used to determine the noise magnitude, i.e., noise level, based on the output of the high-pass filter and to smooth out the noise signal. In such an instance, the current or voltage threshold can be made dependent on one or more parameters of the high-pass filter and/or the low-pass filter, such as filter bandwidth.

The setting of the fault flag can automatically cause the execution of one or more preventive or precautionary actions. For example, upon setting the fault flag, a signal can be generated to alert an operator of the failure event. This signal can be an audible sound, a visual signal, and/or an electronic signal. The fault detection system can also automatically shut off the operating current supplied to the plasma arc torch or alter other operating parameters to avoid the failure event.

Figure 2:
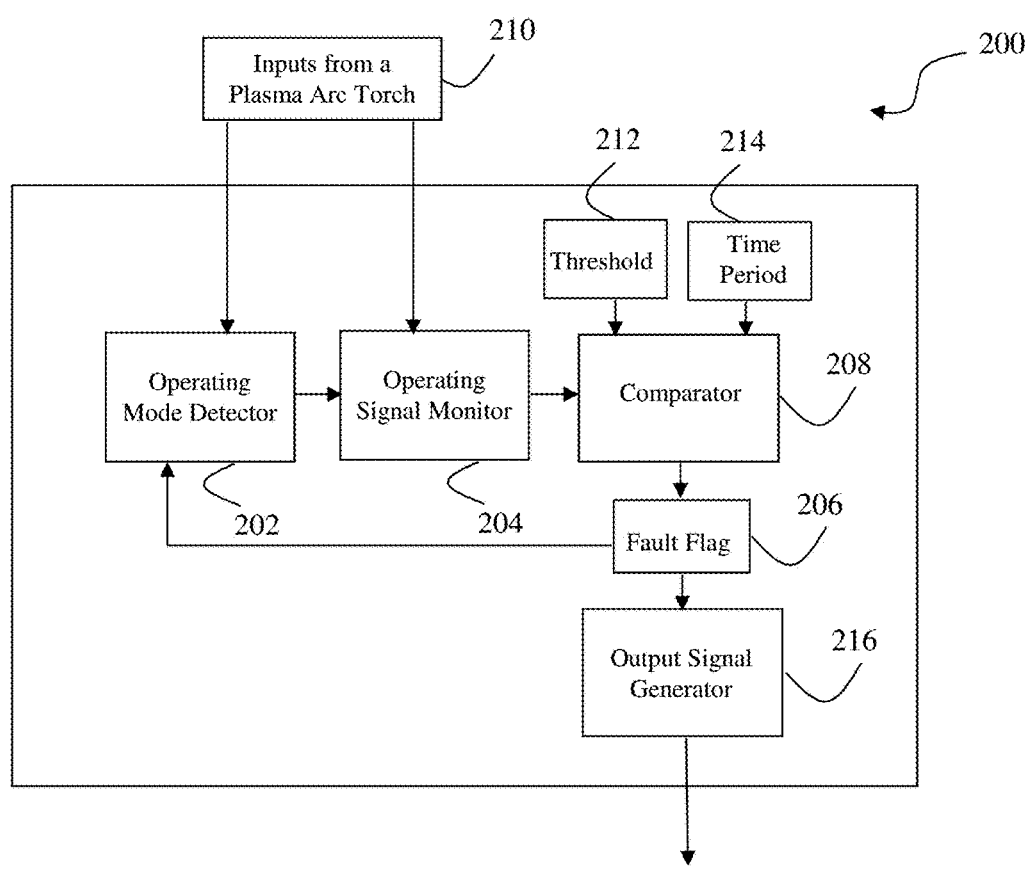
FIG. 2 shows an exemplary computer numerical controller (CNC) for diagnosing and preventing a consumable failure in a plasma arc torch.

FIG. 2 shows an exemplary CNC 200 for diagnosing and preventing a possible consumable failure in a plasma arc torch. The system 200 can be implemented using one or more digital signal processors. The system 200 includes an operating mode detector 202, an operating signal monitor 204, a comparator 208, a fault flag 206 and an output signal generator 216. Based on one or more inputs 210 from a plasma arc torch, the operating mode detector 202 is configured to determine whether the plasma arc torch is operating in a transfer arc mode. The operating mode detector 202 can generate an output signal to indicate the result of such determination. In some embodiments, if the fault flag 206 is not set, which indicates that no possible failure event has been detected, the operating mode detector 202 is adapted to periodically poll certain signals from the plasma arc torch 210 to determine whether the torch is still in the transfer arc mode or has entered the transfer arc mode.

The operating signal monitor 204 receives as an input the output from the operating mode detector 202 and, if the output indicates that the torch is in a transfer arc mode, monitors one or more operating signals of the plasma torch 210. The operating signals can be an operating current and/or an operating voltage of the plasma arc torch. In some embodiments, the operating signal monitor 204 determines one or more parameters associated with each of the operating signals. For example, the operating signal monitor 204 can compute current amplitude, rate of current change or current amplitude fluctuation of the signal of the signal is an operating current. As another example, the operating signal monitor 204 can compute arc voltage amplitude, rate of arc voltage change or arc voltage amplitude fluctuation of the signal if the signal is an operating voltage. In some embodiments, the operating signal monitor 204 is adapted to periodically sense the one or more operating signals and compute the parameters associated with the sensed signals.

The comparator 208 compares a parameter of an operating signal supplied by the operating signal monitor 204 with a predetermined threshold value 212. The comparator 208 can set the fault flag 208 to signal a possible fault if the parameter consistently exceeds the threshold 212 for a predetermined time period 214. In some embodiments, the comparator 208 sets the fault flag 208 only if multiple parameters exceed their respective thresholds 212 for the requisite time period 214.

In response to the fault flag 206 being set by the comparator 208, the output signal generator 216 is configured to generate an output signal alerting of the possible consumable failure. In some embodiments, the output signal alters certain operating parameters of the torch to minimize potential damages, such as shutting off the operating current supplied to the torch.

Figure 3A:
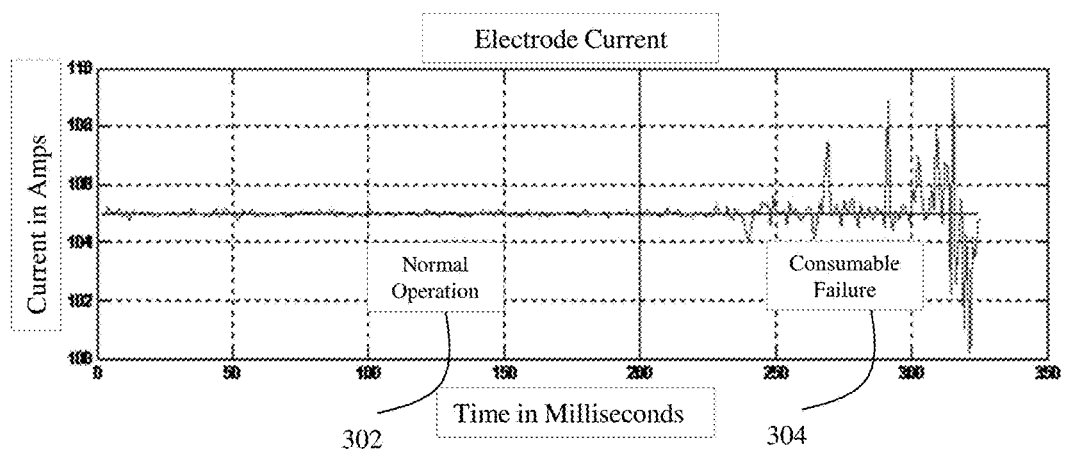
FIGS. 3A and 3B show exemplary electrode current and electrode arc voltage waveforms, respectively, of a plasma arc torch.
Figure 3B:
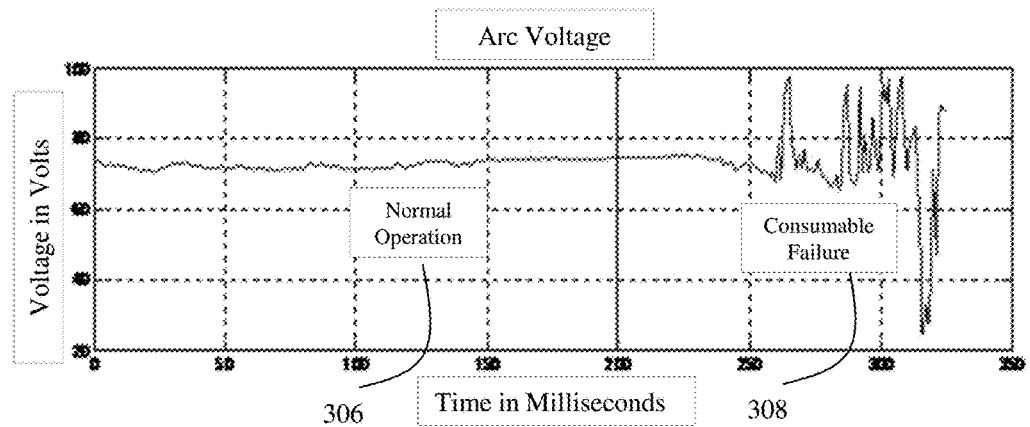

FIGS. 3A and 3B show the electrode current and electrode arc voltage waveforms, respectively, of a plasma arc torch that can be monitored by the operating signal monitor 204. Each waveform represents the behavior of the signal in both a normal operating state and a consumable failure state. As shown in FIG. 3A, a significant spike in the electrode current is observed when a consumable failure event 304 occurs in a plasma arc torch in comparison to the current generated during a normal torch operation 302. Similarly, FIG. 3B shows that a significant spike in the arc voltage is observed during a consumable failure event 308 in comparison to the arc voltage generated during a normal torch operation 306. The spikes in the signals during a consumable failure event allow the detection system 200 to detect the event and take appropriate measures before damages reach to other torch components.

Figure 4A:
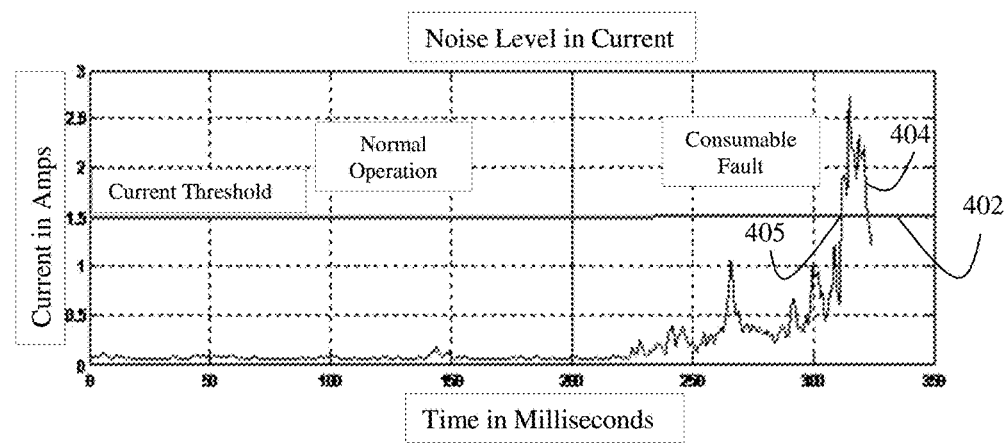
FIGS. 4A and 4B show the noise levels of the electrode current and the arc voltage in FIGS. 3A and 3B, respectively.
Figure 4B:
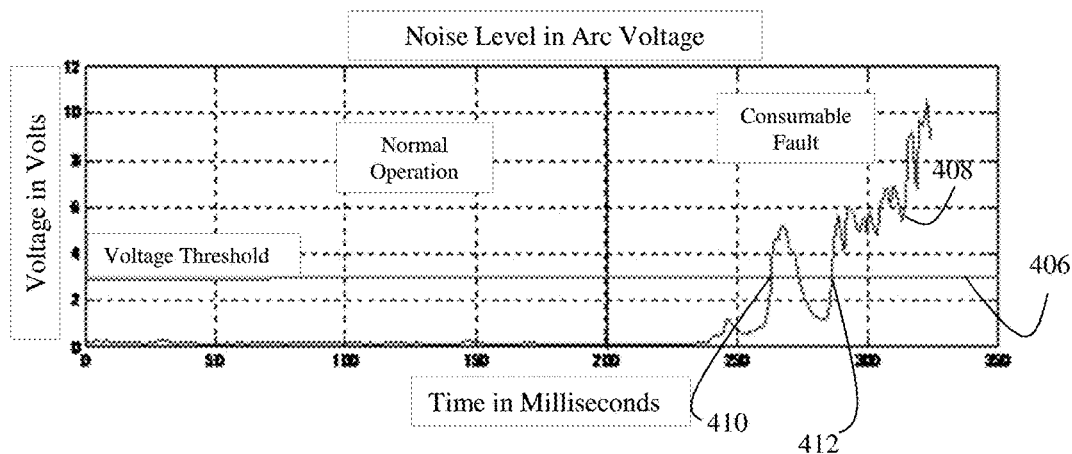

FIGS. 4A and 4B show the noise levels of the electrode current and arc voltage determined from the signals in FIGS. 3A and 3B, respectively. Such determination can be processed by the operating signal monitor 204 of the failure detection system 200. A noise level represents the noise magnitude of a signal, which can be calculated from the original signal using a digital filter and digital signal processor. As shown in FIG. 4A, the current threshold 402 is used to identify a potential consumable failure by comparing against the noise level of the electrode current 404. As described above, the current threshold 402 can vary depending on the output current setting of a torch. For example, if the output current setting is less than about 45 Amps, the current threshold is about 1.0 Amp. If the output current setting is between about 45 Amps and about 75 Amps, the current threshold is about 1.25 Amps. If the output current setting is above about 75 Amps, the current threshold is about 1.5 Amps. In general, the higher the output current setting, the higher the current threshold. For the plasma torch used to generate the waveform 404 of FIG. 4A, the output current setting is greater than about 75 Amps. Therefore, the current threshold 402 can be about 1.5 Amps. In some embodiments, the current threshold varies depending on one or more parameters of the filters used to process the signals.

Similarly, the voltage threshold 406 in FIG. 4B is used to identify a potential consumable failure by comparing against the noise level of the arc voltage 408. In some embodiments, the voltage threshold 406 can be about 3V for all output current settings. In some embodiments, the voltage threshold varies depending on the parameter of the filters used to process the signals.

In certain embodiments, the detection system 200 detects a possible consumable failure based on the noise level of the operating current. In the example shown in FIG. 4A, the electrode current 404 exceeds the threshold 402 at time 405 after 300 milliseconds of arc mode operation. If samples of the electrode current taken thereafter consistently exceed the threshold 402 for a specific duration, such as about 1.5 milliseconds, the detection system 200 is adapted to set the fault flag 206 and trigger shutdown of the current supplied to the plasma arc torch or take another preventive measure to protect the torch.

In certain embodiments, the detection system 200 detects a possible consumable failure based on the noise level of the operating voltage 408. In the example shown in FIG. 4B, the arc voltage 408 exceeds the threshold 406 twice, at time 410 and time 412, which are between 250 milliseconds and 300 milliseconds of operation. For the first time 410, if the noise level of the arc voltage thereafter consistently exceeds the threshold 406 for a predetermined duration, the detection system is adapted to set the fault flag 206 to trigger certain preventive actions. On the other hand, if the noise level of the arc voltage 408 does not exceed the threshold 406 for the entire time period, the fault flag 206 is not set and the timer for tracking the amount of time the noise level 408 exceeds the threshold 406 is reset to zero. Upon the voltage noise level 408 crossing the threshold 402 for the second time 412, the timer starts again.

Figure 5:
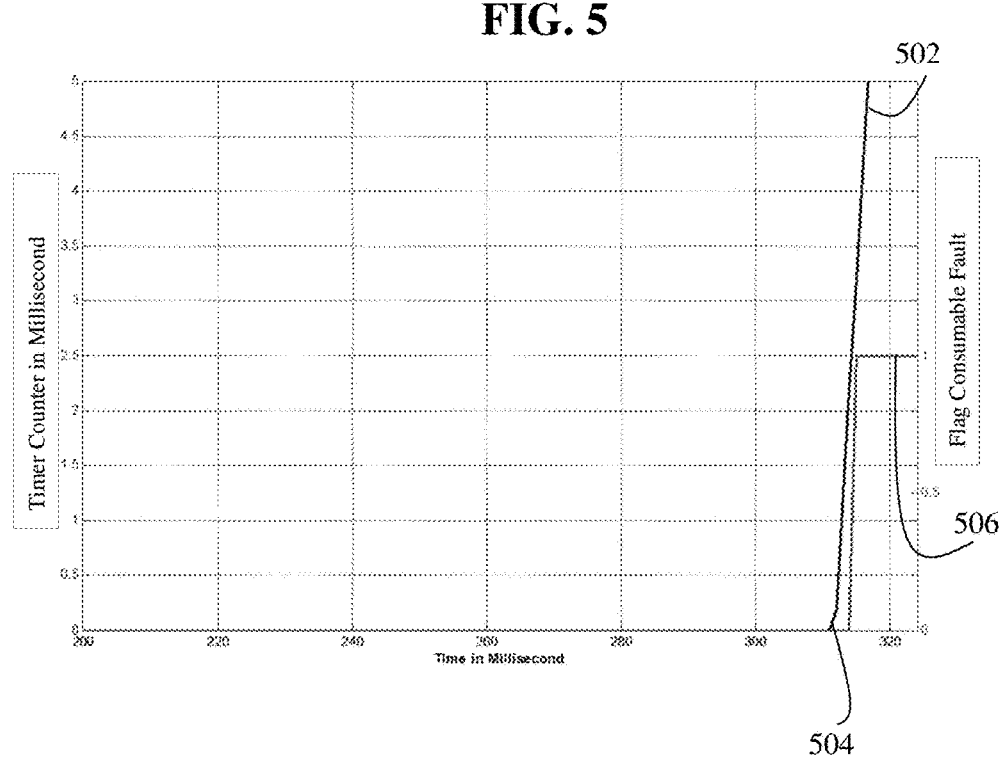
FIG. 5 shows a timer signal and a flag signal for diagnosing and preventing a consumable failure in a plasma arc torch.

In certain embodiments, the failure detection system detects a possible consumable failure based on the noise levels of the operating voltage 408 and the operating current 404. Using the examples shown in FIGS. 4A and 4B, a timer for tracking when the signals exceed their respective thresholds starts at the time 405 when the noise level of the operating current 404 exceeds the threshold 402. This is also the time when the voltage noise level 408 exceeds its threshold 406. Thereafter, if both parameters 404 and 408 consistently exceed their respective thresholds for a predetermined duration, the fault flag 206 is set. On the other hand, if either parameter falls below its corresponding threshold, the fault flag 206 is not set. FIG. 5 shows a timer signal 504 and a flag signal 506 for detecting and preventing a possible catastrophic consumable failure in a plasma torch based on the current noise level 404 and voltage noise level 408 shown in FIGS. 4A and 4B. As shown, the timer signal 502 is not triggered until time 504, which is the time when both the current level 406 and voltage level 408 exceed their respective thresholds. The flag signal 506 is set 1.5 milliseconds later to indicate that both noise levels exceed their respective thresholds for the predetermined duration of 1.5 milliseconds.

Figure 6A:
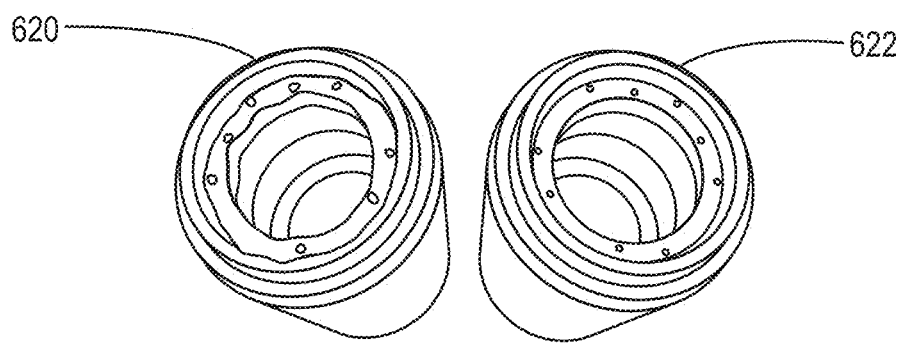
FIGS. 6A-E show exemplary consumables with and without using the failure detection system of the present invention.
Figure 6B:
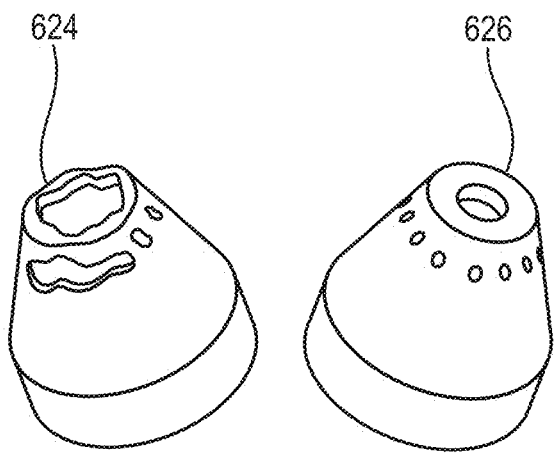
Figure 6C:
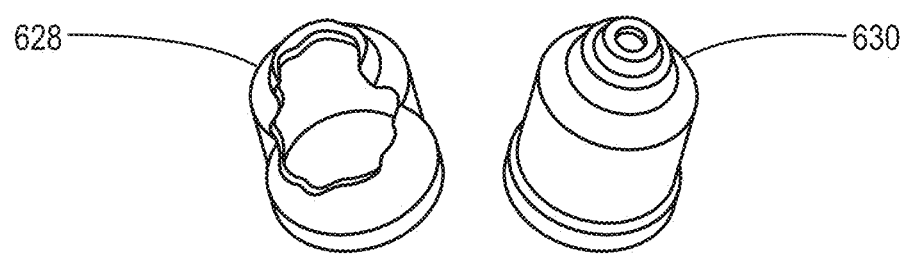
Figure 6D:
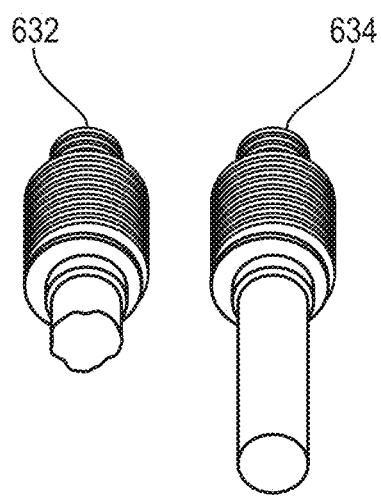
Figure 6E:
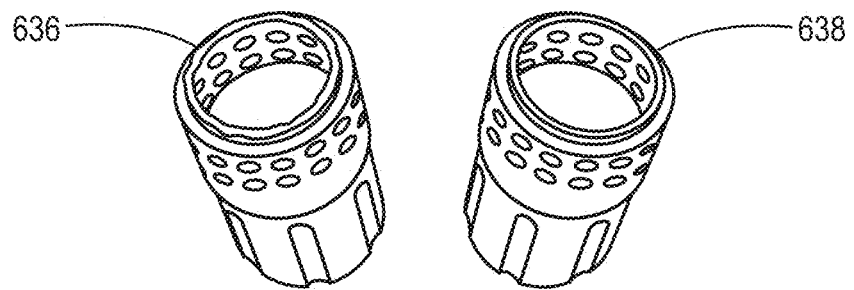

FIGS. 6A-E show exemplary consumables with and without using the failure detection system of the present invention. In general, the consumable parts on the left of FIGS. 6A-E correspond to torch operations without using the detection system and each consumable part experienced about 10 seconds of a failure event. In contrast, the consumable parts on the right of FIGS. 6A-E correspond to torch operations with the detection system, which is adapted to shut off the current supplied to the torches upon detecting a failure event. Specifically, FIG. 6A shows retaining caps 620, 622 as a result of the torch operating without and with the failure detection system, respectively. FIG. 6B shows shields 624, 626 as a result of the torch operating without and with the failure detection system, respectively. FIG. 6C shows nozzles 628, 630 as a result of the torch operating without and with the failure detection system, respectively. FIG. 6D shows electrodes 632, 634 as a result of the torch operating without and with the failure detection system, respectively. FIG. 6E shows swirl rings 636, 638 as a result of the torch operating without and with the failure detection system, respectively. Therefore, the failure detection system is advantageous at least because it prevents damages to other torch components in the event of a consumable failure. For example, the failure detection system can sense when wrong consumables are used for a torch or operating process and take appropriate actions to protect the other torch parts.

Another advantage of the failure detection system is that it can be easily integrated into a plasma arc torch without complex modification of the torch design. In addition, using the failure detection system requires no change to the current operating processes. This is because the detection system already uses existing signals, such as the operating current signal and the operating voltage signal, to perform failure detection. Furthermore, the ability to accurately detect consumable failure events using the failure detection system increases the opportunity for process automation and reduces the need for operator attention.

A plasma arc torch can also be susceptible to damages if the torch loses pressure during a cutting operation. This damage is possible in torch designs that depend on air pressure to position or move components inside the torch (e.g., a "blow-back" or "blow-forward" torch). In these designs, the cutting arc can stay transferred to the workpiece without proper gas pressure and/or flow to constrain and direct the arc. The cutting arc can also stay transferred to the workpiece without the proper pressure to position components relative to one another. This can cause arcing inside the torch, resulting in significant damages to the torch and/or the consumables. In addition, it can cause significant deterioration of cut quality. According to another aspect of the invention, a pressure loss detection technology is provided that can determine the pressure, or a pressure loss, in the plasma arc torch without the use of conventional pressure or flow sensors.

In a plasma cutting torch, there is a strong relationship between the pressure of the gas within the torch and the energy required to sustain a plasma arc. As pressure increases, the energy required to sustain the arc also increases. With a constant current power supply, the energy increase manifests itself as an increase in arc voltage. The pressure loss detection technology of the present invention takes advantage of the relationship between pressure and voltage by using two signals to determine whether a pressure loss occurs within the torch.

The first signal, referred to as VARC, is an estimate of the voltage between the electrode of a plasma arc torch and the workpiece or nozzle. It can be computed based on open circuit voltage ("OCV") and duty cycle of the inverter (i.e., the power source) aided by the use of a low pass digital filter, which removes the high-frequency component of the signal while preserving the signal's DC and low-frequency components.

Figure 7:
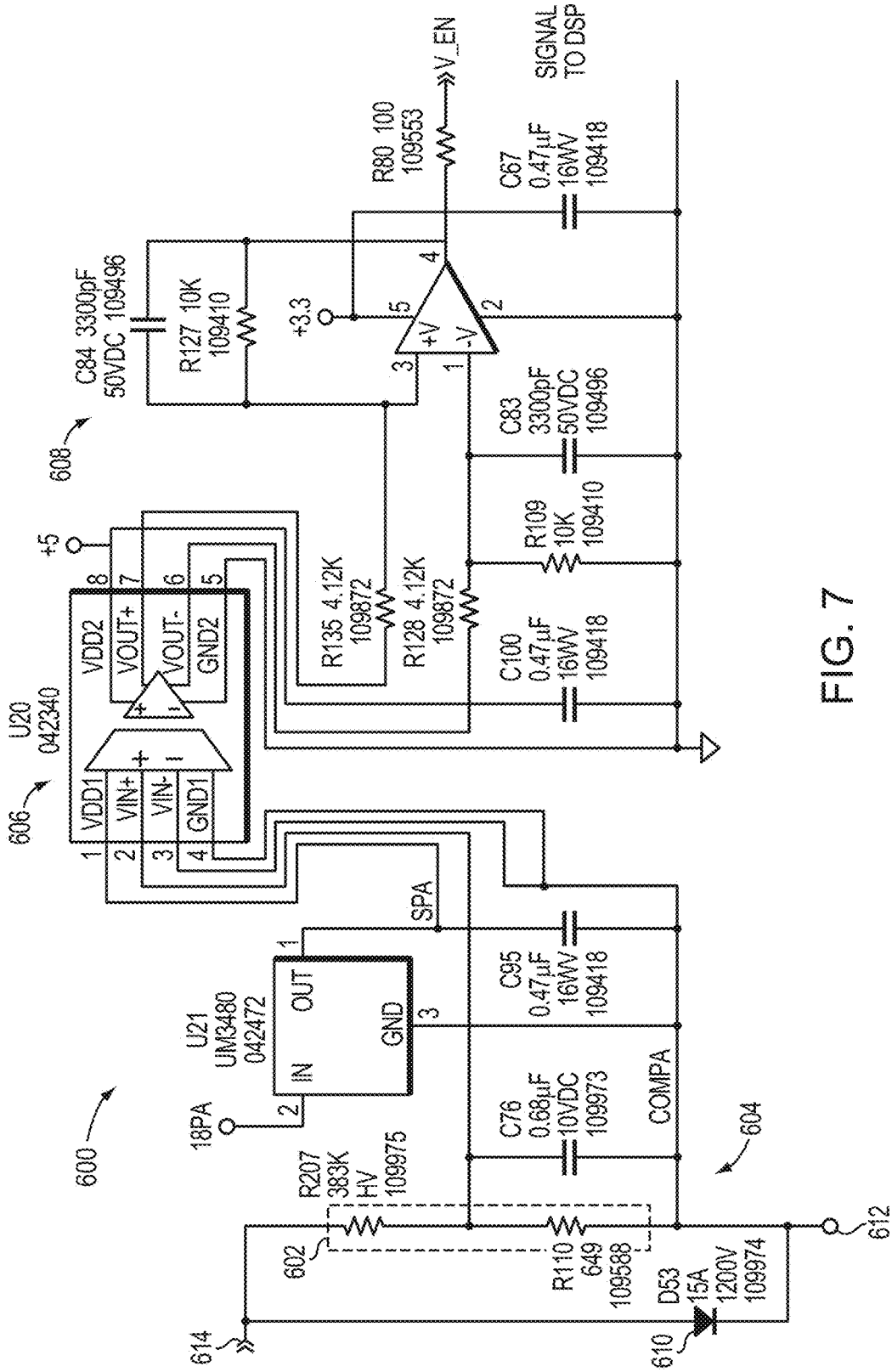
FIG. 7 shows an exemplary circuit for measuring the voltage between the nozzle and the electrode of a plasma arc torch.

The second signal, referred to as VNE, is the voltage between the nozzle and the electrode. FIG. 7 shows an exemplary circuit 600 that can measure the VNE signal and provide an isolated output signal that is fed into a digital signal processor (DSP) for signal processing. The circuit 600 includes a voltage divider 602 coupled to a low pass filter 604, an isolation amplifier 606, which can include an Avago HCPL-7840, and a differential amplifier 608. Additionally, a clamp diode 610 can be coupled between the nozzle 612 and the electrode 614. This diode 610 clamps any ringing transients and produces a low noise signal under all operating conditions (e.g. long leads, coiled torch leads). The low pass filter 604, which is on the nozzle-to-electrode side (input side) of the isolation amplifier 606, operates by filtering out high frequency plasma noise on the input side.

To determine whether a pressure loss occurs in a plasma arc torch, the pressure loss detection system can execute the following sequence of operations. First, the system determines whether the torch nozzle is physically touching the workpiece (touch mode) or physically removed from the workpiece (arc stretch mode). To do this, the voltage values of VARC and VNE are compared. If VARC<(VNE+about 40V) or VNE>about 100V, it is assumed that the nozzle is touching the workpiece and the plasma system is operating in the touch mode. Otherwise, it is assumed that the plasma system is operating in the arc stretch mode.

Depending on the operating mode, the initial operating level of VARC or VNE is determined. If the plasma system is in the touch mode, the initial operating level of VARC is recorded. If the plasma system is in the arc stretch mode, the initial operating level of VNE is recorded. This can be done by waiting for a first predetermined period of time and then computing the average operating level of VARC or VNE over a second period of time. These initial levels computed during the second time period are considered the normal operating levels and are used to calculate corresponding thresholds. In some embodiments, the threshold level for VARC or VNE is set by multiplying 0.625 with the corresponding initial operating level. The fraction 0.625 can be established through experimentation. If the fraction is set higher, the detection system is more sensitive to pressure loss, but also more susceptible to false tripping.

The current value of VARC or VNE is continuously monitored, with an average value computed about every 64 ms. The averaging is used to filter any sharp spikes or dips in the voltage. If the monitored value of VARC or VNE falls below its corresponding threshold, the inverter of the torch is shut down and the detection system 600 performs a fault handling process. The shutdown procedure can involve extinguishing the plasma arc to prevent the low pressure event from damaging the torch. In addition, fault code can be indicated on the front panel of the plasma system.

In some embodiments, a torch operating with an unshielded nozzle can alternate between nozzle touch mode and arc stretch mode by touching and removing the nozzle from the workpiece. The detection system 600 can account for this by, for example, using the appropriate signal, VARC or VNE, depending on the operating condition (nozzle touch or arc stretch).

In some embodiments, the pressure loss detection technology uses analog and/or digital low pass filters to smooth the VNE and VARC signals to prevent false tripping due to noise and spikes in the ADC sampling channel.

Figure 8:
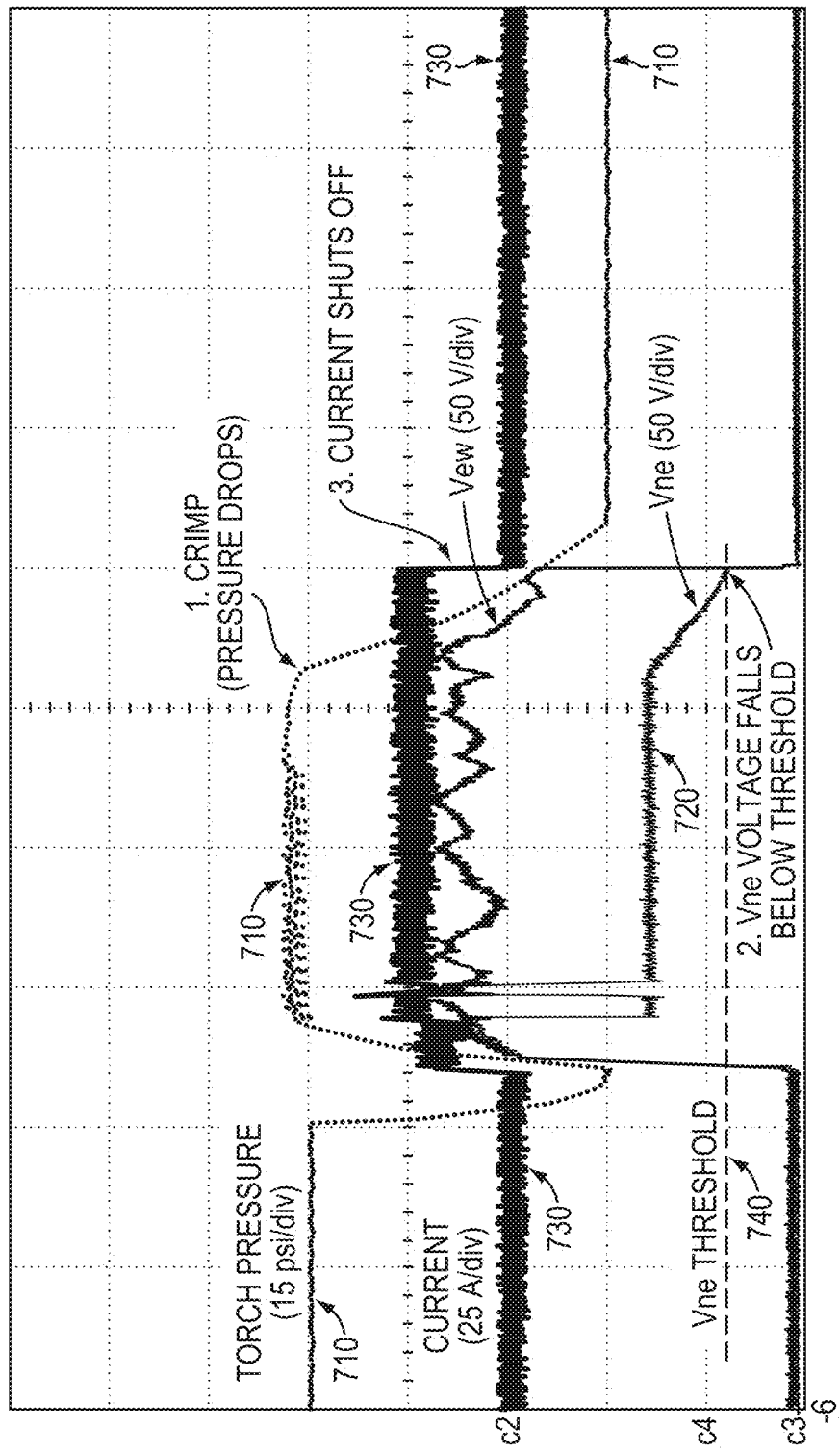
FIG. 8 shows waveforms generated by an exemplary pressure loss detection system of the present invention.

FIG. 8 shows waveforms generated by an exemplary pressure loss detection approach. The first trace 710 shows a decrease in pressure in a plasma arc torch due to, for example, the torch lead being crimped. In response to the decrease in the torch pressure 710, The VNE signal 720 also decreases. Finally, when the VNE signal drops below the VNE threshold 740, the power supply current 730 is shut off.

The pressure loss detection technology has several advantages over conventional flow or pressure sensors. The first advantage is cost. It can be implemented for the cost of circuitry on the power board alone and does not necessitate any additional components. The circuitry cost is about $6. In contrast, low cost conventional flow switches are about $18-$25, not including the cost of additional connectors. In addition, other designs, such as using a pressure sensor in the torch, require a robust sensor in a physically-demanding location (e.g., the torch head) as well as wiring to the sensor. Reliability and cost of the pressure sensor in a physically-demanding location is an issue because the sensor can fail due to the harsh environment. Another advantage is that the pressure loss detection technology can dynamically adjust to different consumables or process parameters. For example, a flow switch can be generally set to a specified flow trip point, which can be dependent on incoming gas pressure. However, the detection technology can be used across any consumable or process, and can even predict which consumable is installed in the torch based on the signature of the voltage signal.

In another aspect, a method is provided to predict the end of life of consumables in a torch based on the voltage between the nozzle and the electrode (VNE) and plasma pressure. The prediction technology can indicate how much life, for example, the approximate amount of time, left before the consumable need to be changed or the number of cuts that can be made before the consumable is changed. It has been observed that electrode wear of a torch is proportional to the torch's pit depth, and the VNE is related to pit depth. For example, in an ideal situation, the VNE increases proportionally with an increase of pit depth. Hence, the VNE can be used to determine electrode wear. However, the VNE is also influenced by the pressure in the plasma plenum chamber. Furthermore, high electrical-magnetic noises, system tolerances, and operating variance can significantly reduce the accuracy and consistency of the VNE-pit depth relationship. An algorithm is provided using the VNE and the pressure of the plenum (i.e., plasma gas) to accurately predict in real time the electrode life in a plasma cutting process. Specifically, the plasma pressure is monitored and used to compensate the VNE measurement.

Figure 9:
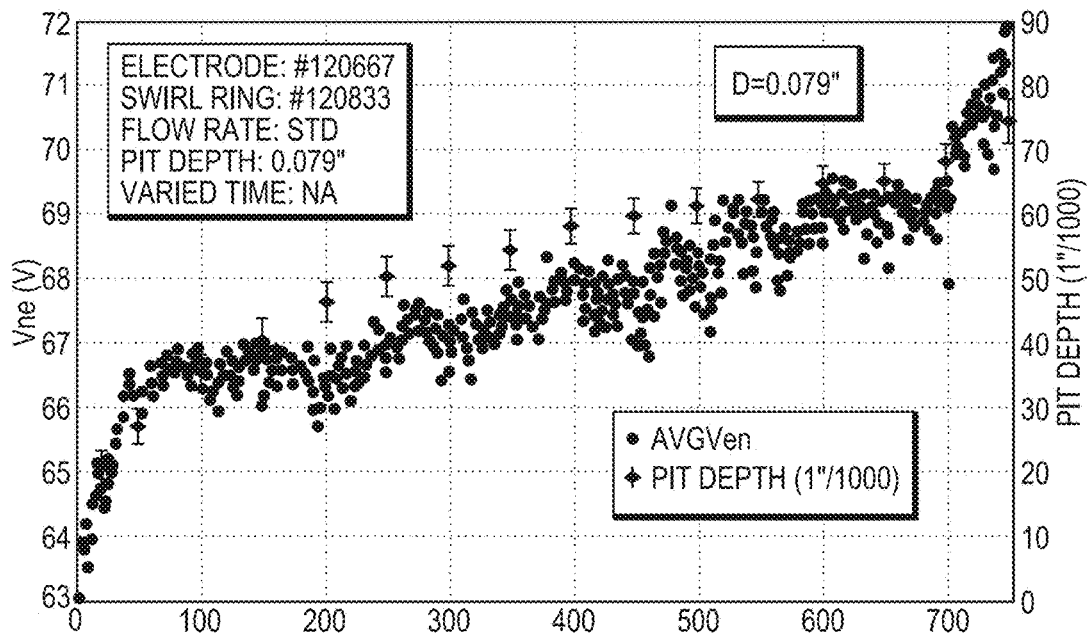
FIG. 9 shows an exemplary relationship between electrode pit depth and the voltage between a nozzle and an electrode (VNE).

It has been observed that the life of an electrode can be estimated by the pit depth, which results from material loss due to thermal erosion. FIG. 9 shows an exemplary relationship between VNE of a plasma arc torch and pit depth of the electrode in the torch. For example, a pit depth of about 0.040-0.060 inches usually represents the end of or near end of electrode life. Such pit depth can correspond to about a 6-8 V rise in the VNE. Therefore, the VNE can be monitored and a rise in the VNE can be used to predict the life of the electrode.

Figure 10:
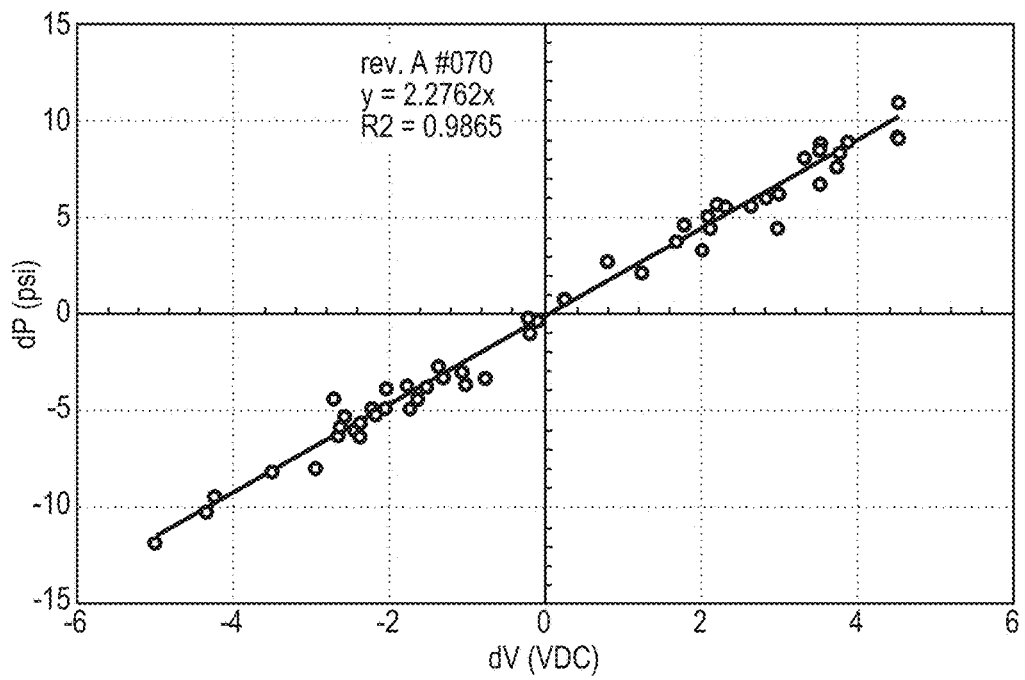
FIG. 10 shows an exemplary relationship between the VNE and the plasma inlet pressure.

In addition, since VNE is strongly affected by the pressure in the plasma plenum chamber, the VNE can be compensated by the plasma pressure as a compensation factor. However, due to the difficulty in measuring the plasma plenum chamber pressure directly, torch inlet pressure can be measured in the location immediately before the plasma gas enters the torch body. For example, the inlet pressure can be measured in an off-valve assembly. To compute the compensation factor, it is notes that, in a small variation region, the VNE and the plasma inlet pressure have a linear relationship as shown in FIG. 10. This relationship can be used to define the compensation factor for the VNE. In the example shown in FIG. 10, the compensation factor dV/dP is 0.46 Volts/psi. The dV/dP is not only considered to compensate for the gas supply pressure variances in a small variation range, it can also compensate for other variances, such as current or standoff distance, which either directly or indirectly affect both VNE and plasma pressure.

In an exemplary implementation of a method for predicting the end of life of an electrode in a plasma arc torch in real time, data acquisition is first triggered when the arc is ignited and successfully transferred and the acquired data are stored. The number of arc starts is also recorded. In the first few starts, the initial VNE and pressure are calculated and stored as baseline. Each VNE and pressure is measured after the plasma reaches its steady state. Thereafter, the VNE is compensated for pressure variation. The compensated VNE is further averaged with previous numbers of results to reduce the fluctuations associated with random noises. The difference between the present compensated VNE and the initial baseline VNE (VNE rise) is used to estimate the electrode usage according to an empirical VNE-life relationship. When the VNE rise reaches a preset threshold, an "End-of-Life" warning is generated as an output.

Figure 11:
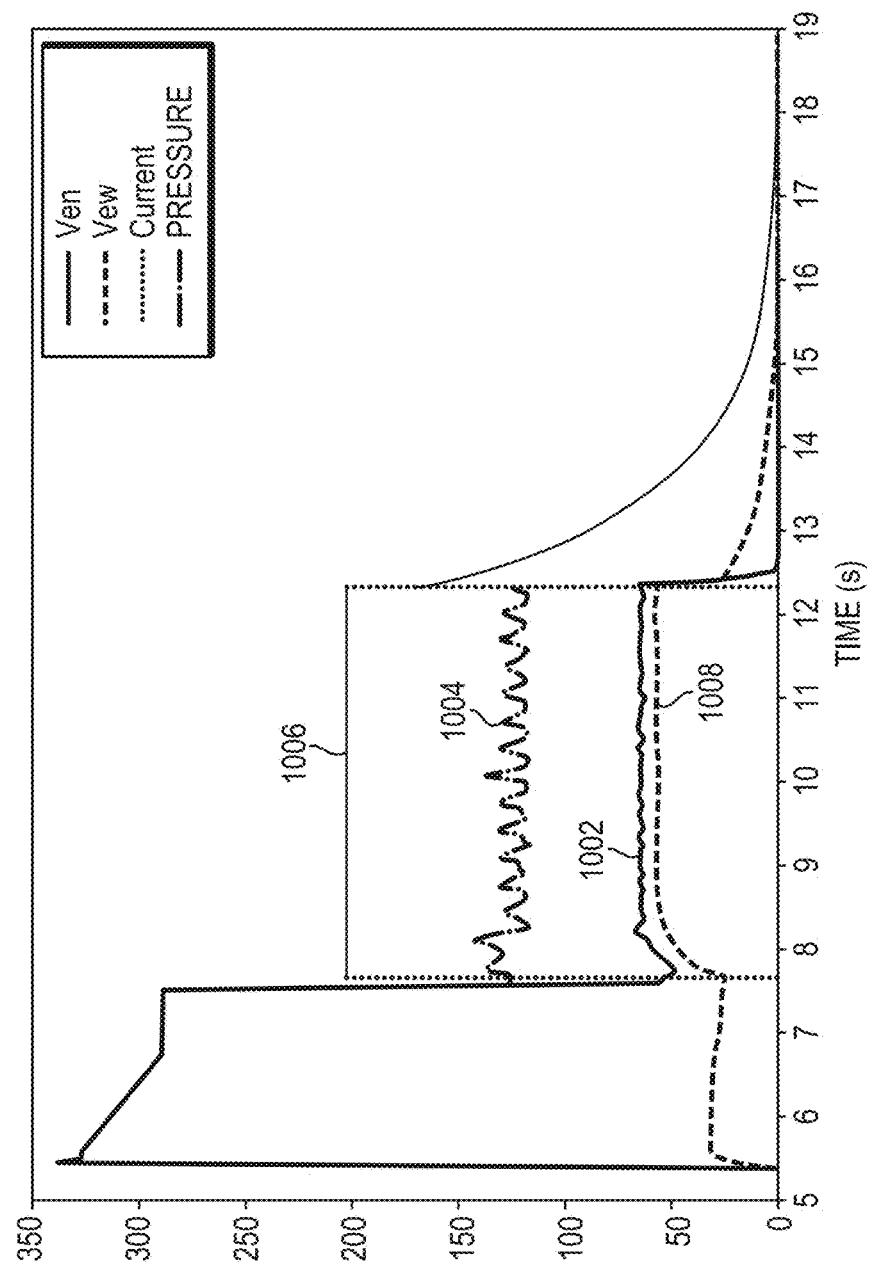
FIG. 11 shows signals generated during an exemplary plasma arc torch operation.

As described above, after the plasma arc of a torch reaches its steady state, the VNE and the gas pressure can be sampled. FIG. 11 shows exemplary waveforms of the VNE 1002, the VARC 1004, the current 1006 and the torch inlet pressure 1008 for a 4-second cut obtained using a 200-Amp oxygen/air system. As shown, the time for the torch inlet pressure 1008 and the VNE 1002 to reach a steady state can be about 2 seconds. After the plasma arc reaches the steady state, the algorithm can calculate the average values of the VNE and the gas pressure over a given time period, for example, 0.5 second. These averages are considered as the initial VNE and initial pressure of the current arc start. In some embodiments, if a set of new consumables is installed in the first $N_i$ number of arc starts, the algorithm calculates averaged VNE and pressure and stores them as the initial VNE and pressure.

The current values of VNE and pressure are continuously sampled after the plasma reaches its steady state. A measured VNE value can be compensated for pressure variation using a pre-calculated dV/dP multiplied by the difference between the current measured pressure and the initial pressure:

$$V_{NE,Compensated}=V_{NE,measures}+(P_{measured}-P_{initial})\times(dV/dP)$$

A rolling average can be used to smooth the real time data. The compensated VNE obtained for the current arc start (assuming start number $N_s$) is averaged with previous number of $N_R$ starts:

$$V_{NE,Rolling} = \frac{\left(\sum_{i=N_S-N_R+1}^{N_S} V_{NE,Compensated,i}\right)}{N_R}$$

The rise of VNE is given by the difference between the current rolling averaged VNE and the initial VNE:

$$V_{NE,Rise}=V_{NE,Rolling}-V_{NE,initial}$$

When the VNE rise reaches or exceeds a predetermined threshold, a warning signal can be given to the operator. This signal indicates that the electrode is approaching the end of its life and is likely to fail soon. Furthermore, an empirical relationship between the VNE rise and the life of the electrode can be obtained from a large database of previous tests. In one embodiment, previous VNE profiles are averaged to develop an average profile to use in real time. The percentage of remaining electrode life can be derived from this relationship together with the VNE rise.

In one example, for a 200-Amp oxygen/air process, the values of the parameters discussed above are: $N_i$=10, $N_R$=5, VNE threshold=6V and dV/dP=0.46 V/psi.

In some embodiments, to use the end-of-life prediction technology of the present invention, a user can select from a user interface the process and the condition of the electrode (e.g., new or used) for which prediction is required. A gauge of the user interface can continuously report the amount of electrode remaining. At the end of the electrode life, an "End-of-Life" output can be generated. The prediction technology can report the real-time condition of the electrode with high accuracy. For example, at a confidence of 90%, the algorithm can predict at least 75% of the electrode usage with a standard operation process.

One advantage of the prediction technology is that no complex redesign is involved when integrating the technology into an existing plasma arc system. The technology can use existing internal signals, such as the VNE of the plasma process, to perform end-of-life detection of an electrode. Only one extra sensor may be added to the plasma system. In addition, there is no change for the current plasma cutting process. Neither the system nor the process needs to be redesigned. The technology can be easily integrated into upgraded system through retrofitting. The technology can self-calibrate using the plasma cutting process itself when changing consumables.

The pressure compensation and rolling average aspect of the technology gives the technology the capability to reduce the effects of operation variances and improves the system robustness. The rolling average works as an effective noise filter to increase the signal-to-noise ratio. The pressure compensation and digital filter can enable highly accurate life predictions for the electrode.

The technology can use rigid threshold and an empirical VNE-life relationship to estimate the electrode usage. The ability to accurately predict the inevitable approaching of the end of electrode life increases the opportunity for process automation and reduces the need for operator attention.

In another aspect, an algorithm is provided that uses a temporally-resolved nozzle-to-electrode voltage (VNE) signal to indicate occurrences of double arc during plasma cutting process. The technology can utilize real time data acquisition, effective filter and digital signal processing to increase the signal-to-noise ratio and capture the time duration when double arc happens.

In a plasma cutting torch, the arc column functions as an electrical conductor between the electrode (cathode) and the workpiece (anode). The nozzle works as a restrictor to restrict the arc column and increase the energy level when plasma gas flows through the orifice. Normally, the arc column stays co-axial with the nozzle orifice. When a double arc occurs, however, the arc column makes contact with the nozzle such that the electrical current path becomes electrode-nozzle-workpiece instead of electrode-workpiece. When a double arc occurs, the arc root where the arc attaches to the nozzle has high energy density resulting in a high temperature. The temperature can rise beyond the melting point of the nozzle material, causing small amount of nozzle material to melt or vaporize. Such nozzle material loss leads to change in the shape of the nozzle orifice and can result in deterioration in cutting quality and shortening of consumable life. In the worst case, a double arc can completely destroy the consumables and ruin the cut parts.

Systems and methods are provided to evaluate the nozzle damage caused by double arcing by consistently detecting the double arcs during the cutting process. Such real-time detection and monitoring can provide an opportunity for plasma cutting process automation, improve the cutting quality consistence and reduce dependence on uninterrupted operator attendance. By promptly and reliably capturing double arcing events, they can be used to detect nozzle damage or nozzle life.

In some embodiments, the nozzle-to-electrode voltage (VNE) is used to detect the wear of the electrode since it represents the plasma characteristics of a plasma process. Double arcing represents a dramatic variation of an arc column because the arc changes its shape and the current path. The VNE will inevitably reflect such a dramatic variation of the arc condition. However, most double arc conditions happen uncontrollably for a very short period of time, for example, about 1-100 milliseconds. Therefore, a relatively high-speed data acquisition approach is required to investigate the occurrence of a double arc. To accomplish this, a data acquisition system can be operated at a sampling rate of about 2000 Hz.

In some embodiments, a method is provided to increase the probability of a double arc in a plasma arc torch. First, the operating current is increased. Then the plasma gas flow rate is decreased. The nozzle orifice size is also reduced or the arc stability is disturbed by, for example, applying an external magnetic field. In some examples, tests are conducted on both a 100-Amp and a 200-Amp oxygen/air process. For the 100-Amp process, the variations of current and the gas flow rate can be used to induce a double arc. For the 200-Amp process, the orifice size and gas flow can be used to induce a double arc.

Figure 12:
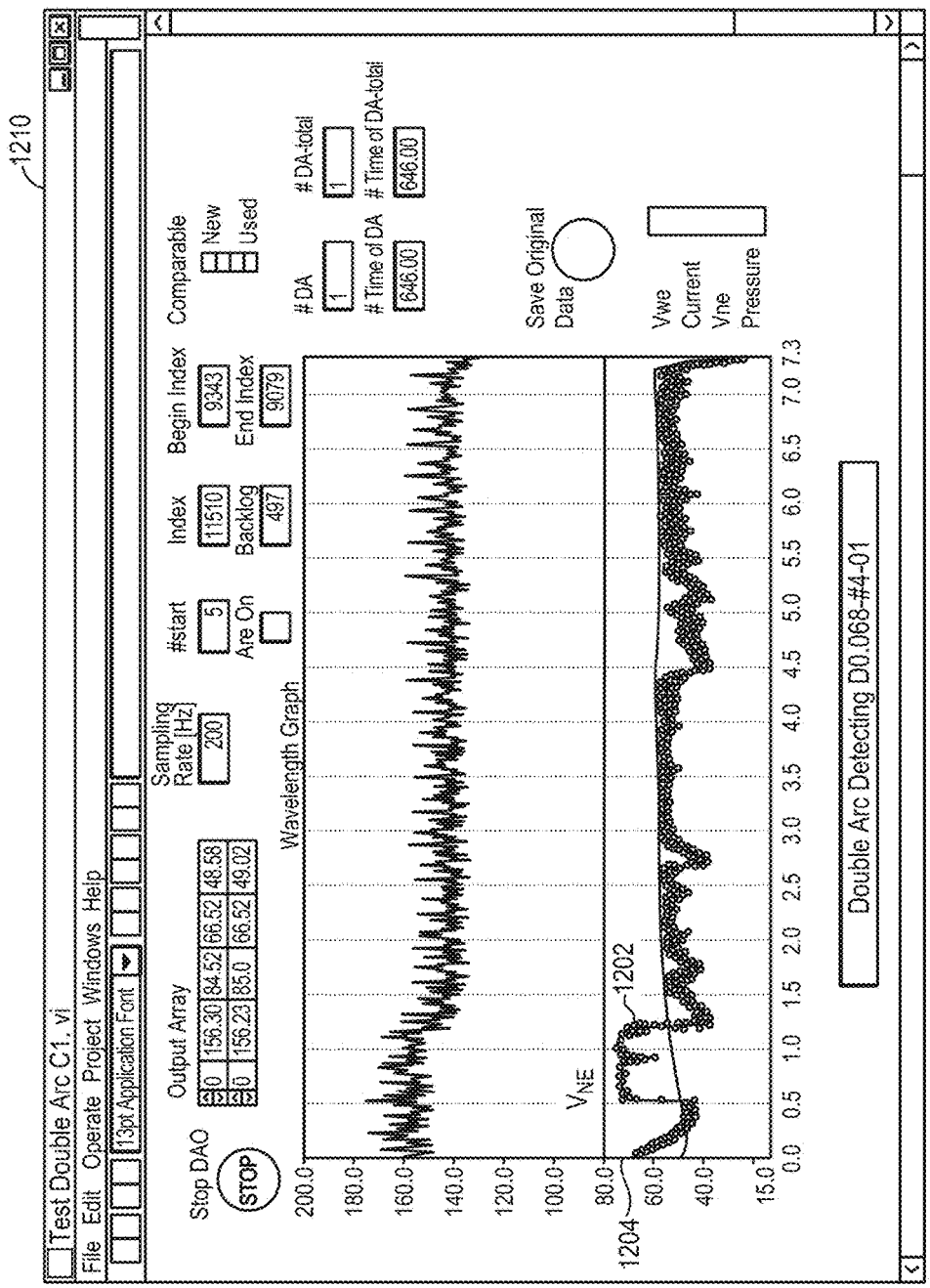
FIG. 12 shows an exemplary graphical user interface.

FIG. 12 illustrates an exemplary user interface 1210 of a real-time data acquisition program for double arc detection and monitoring. The data of FIG. 12 is obtained with a 200-Amp oxygen/air process. The orifice of the nozzle was modified from about 0.082" to about 0.068" and the plasma gas flow from about 38 standard liters per minute ("slm") to about 25 slm. A magnetic interference was also introduced. Waveform 1202 in the plot panel 1204 represents the VNE. The sudden change in the VNE waveform 1202 from about 0.5 seconds to about 1.2 seconds indicates a double arc. The interface 1210 also shows that the duration of the double arc is about 646 ms, as determined by the algorithm described below. The waveform 1202 represents a typical waveform of VNE when double arcing occurs. While the shape change in the waveform 1202 caused by double arc is not difficult to identify visually, it is quite challenging to capture mathematically to clearly distinguish it from normal arc fluctuations.

Figure 13:
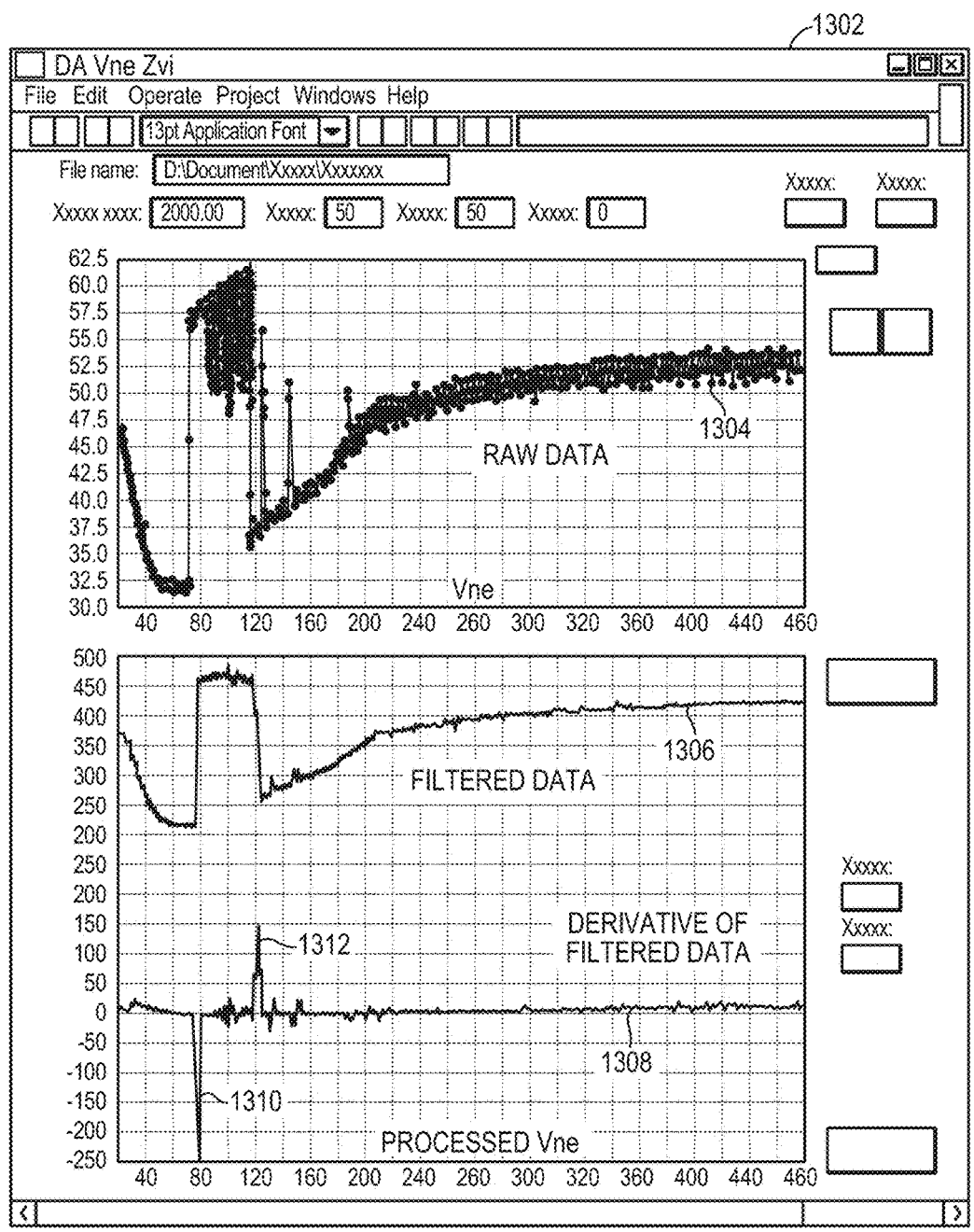
FIG. 13 shows another exemplary graphical user interface.

FIG. 13 illustrates an example of a graphical user interface 1302 of data process software for double arc detection. The upper waveform 1304 is the raw data obtained from real-time data acquisition. The middle waveform 1306 is the data after rolling average filtering. The bottom waveform 1308 is a derivation of the rolling average data. The data are obtained using 100-Amp oxygen/air consumables running at 160 Amps and about 60% of the normal plasma flow rate.

An algorithm can be constructed to calculate the time duration of double arc. In this algorithm the raw data, such as the waveform 1304, is first rolling averaged over large number ($N_R$) of data points, which can smooth out small variations caused by noises. The waveform 1306 is an exemplary result of such rolling average filtering. Then, derivation over the other number ($N_D$) of data points is performed on the rolling averaged data. The waveform 1308 is an exemplary derivation of the rolling average data 1306.

$$V_{Rolling,i} = \frac{\sum_{n=i-N_R+1}^{i} V_n}{N_R}$$

$$\Delta_i = V_{rolling,i} - V_{rolling,i-N_D}$$

The sampling rate can be set to 2000 Hz. Both $N_R$ and $N_D$ can be set at 50. All double arcs can be successfully detected based on the derivation results. For example, as shown in FIG. 13, the pair of opposite peaks 1310, 1312 in the derivation profile 1308 indicates the beginning and the end of double arc event and the time between these two peaks is the duration of the double arc. It is also noticeable that some very short double arcs are smoothed out by the rolling average. The short double arcs do not seem to cause significant damage to the nozzle since the heat input is relatively small. This is partly due to the fact that the heat transfer to the arc attachment is not a direct function of the voltage variation because the voltage drop across the sheath between the plasma and the solid nozzle surface is determined by the properties of the plasma gas and adjacent solid material. Based on this theory, the heat loading to the nozzle during double arc is a function of time under a given set of plasma operating parameters. In some embodiments, the algorithm can filter out all double arcs shorter than 10 ms.

The real-time data acquisition and process algorithm can capture a double arc immediately after it happens. The capability of detecting double arc and determining its duration provides an opportunity to monitor the nozzle damage and predict the service life of nozzle, which can lead to automation of the plasma cutting process.

The algorithm can use rolling average and derivation to process highly noisy data. The data processing can significantly increase the signal-to-noise ratio and automatically ignore insignificant double arcs. The technology can use the nozzle-to-electrode voltage as the primary signal. Neither system nor process parameters need to be altered in order to use the algorithm.

The VNE signal used in the algorithm can also been used in the electrode wear indication. The two monitoring systems can be combined in tandem to monitor conditions of both the nozzle and the electrode.

A nozzle damage baseline can be established, so the damage of the nozzle can be appraised to correlate to the recorded double arc duration. An algorithm similar to an electrode wear indication algorithm can be construed, and the nozzle condition can be reported in real-time by detecting and monitoring the double arcs.

Although various aspects of the disclosed method have been shown and described, modifications may occur to those skilled in the art upon reading the specification. The present application includes such modifications and is limited only by the scope of the claims.

What is claimed is:

1. A method of determining a failure event of consumable for a plasma torch, the method comprising:
    monitoring, during operation of the plasma torch, at least one signal comprising an operating current or an operating voltage;
    determining whether the plasma torch is being operated in a transfer arc mode; and
    performing, when the plasma torch is operating in the transfer arc mode, steps including:
        filtering, during the transfer arc mode, the at least one signal using a high-pass filter to remove a low-frequency component of the at least one signal, thereby generating at least one filtered signal;
        setting a fault flag to indicate a potential consumable failure when a parameter of the at least one filtered signal exceeds and does not fall below a tolerance threshold during a predetermined time period, wherein the tolerance threshold corresponds to a predetermined success rate for capturing consumable failure; and
    shutting off at least one of the operating current or the operating voltage of the plasma arc torch during the transfer arc mode when the fault flag is set to indicate the potential consumable failure.

2. The method of claim 1 wherein the time period comprises about 1.5 milliseconds.

3. The method of claim 1 wherein the at least one signal is the operating current and the parameter of the at least one filtered signal comprises current amplitude, rate of current change or current amplitude fluctuation.

4. The method of claim 1 wherein the at least one signal is the operating voltage and the parameter of the at least one filtered signal comprises arc voltage amplitude, rate of arc voltage change or arc voltage amplitude fluctuation.

5. The method of claim 1 wherein the failure event includes an absence of an emitter in an electrode, a large loss of consumable material, an arc emitting off of a part of the electrode other than the emitter, or a combination thereof.

6. The method of claim 1 wherein the failure event includes installing a wrong consumable for a type of operation of the plasma torch.

7. The method of claim 6 wherein the type of operation comprises a cutting operation, heating operation, a gouging operation or a marking operation.

8. The method of claim 1 wherein the at least one signal comprises both the operating current and the operating voltage and wherein the setting a fault flag comprises determining when both the operating current and the operating voltage do not fall below their respective thresholds during the time period.

9. The method of claim 1 further comprising determining the tolerance threshold based on an output current of the plasma torch.

10. The method of claim 9 wherein the tolerance threshold comprises a current threshold of about 1.0A if the output current is less than about 45A, a current threshold of about 1.25A if the output current is between about 45A and about 75A, or a current threshold of about 1.5A if the output current is greater than about 75A.

11. The method of claim 1 wherein the tolerance threshold comprises a voltage threshold of about 3V.

12. The method of claim 1, wherein the at least one signal is the operating current, and the parameter of the filtered signal is current amplitude.

13. A method of operating a plasma arc torch, the method comprising:
    monitoring, during operation of the plasma torch, an operating current signal of the plasma arc torch;
    determining whether the plasma arc torch is being operated in a transfer arc mode; and
    performing, when the plasma torch is operating in the transfer arc mode, steps including:
        filtering, during the transfer arc mode, the operating current signal using a high-pass filter to remove a low-frequency component of the operating current signal, thereby generating at least one filtered current signal;
        calculating an amplitude associated with the filtered current signal;
        determining when the amplitude of the filtered current signal exceeds and does not fall below a predetermined threshold during a predetermined time period, wherein the predetermined threshold corresponds to a predetermined success rate for capturing consumable failure; and
        providing a failure signal during the transfer arc mode when the amplitude of the filtered current signal exceeds and does not fall below the predetermined threshold during the predetermined time period.

14. The method of claim 13 wherein the time period comprises about 1.5 milliseconds.

15. The method of claim 13 wherein the failure signal includes shutting off the operating current of the plasma arc torch, an audible sound, a visual signal, an electronic signal, changing at least one operating parameter of the plasma arc torch, or a combination thereof.

16. A method for detecting a failure event of consumable of a plasma arc system, the plasma arc system having a controller and a plasma arc torch, the method comprising:
    monitoring by the controller, during operation of the plasma torch, at least one signal comprising an operating current or an arc voltage of the plasma arc torch for the failure event, monitoring for the failure event including at least one of:
        monitoring the operating current signal including monitoring a parameter of the operating current signal comprising (a) current amplitude, (b) rate of current change, or (c) current amplitude fluctuation; or monitoring the operating voltage signal including monitoring a parameter of the operating voltage signal comprising (a) arc voltage amplitude, (b) rate of arc voltage change, or (c) arc voltage amplitude fluctuation;

determining whether the plasma arc torch is being operated in a transfer arc mode; and performing, when the plasma arc torch is operating in the transfer arc mode, steps including:

filtering, during the transfer arc mode, the at least one signal using a high-pass filter to remove a low-frequency component of the at least one signal, thereby generating at least one filtered signal;

determining when the parameter of the at least one signal exceeds and does not fall below a tolerance threshold during a predetermined time period indicative of the failure event, wherein the predetermined threshold corresponds to a predetermined success rate for capturing consumable failure; and providing, during the transfer arc mode, a failure signal from the controller to the plasma arc system upon detection of the failure event.

17. The method of claim 16 wherein the failure signal comprises shutting off the operating current of the plasma torch, audible sound, visual signal, electronic signal, changing at least one operating parameter to protect the plasma arc torch, or a combination thereof.

18. A method of determining a failure event of consumable for a plasma torch, the method comprising:

monitoring, during operation of the plasma torch, at least one signal comprising an operating current or an operating voltage;

determining whether the plasma torch is being operated in a transfer arc mode; and performing, when the plasma torch is operated in the transfer arc mode, steps including:

filtering, during the transfer arc mode, the at least one signal using a high-pass filter to remove a low-frequency component of the at least one signal, thereby generating at least one filtered signal;

setting a fault flag to indicate a potential consumable failure when a parameter of the at least one filtered signal does not fall below a tolerance threshold during a predetermined time period; and shutting off at least one of the operating current or the operating voltage of the plasma arc torch during operation of the plasma torch when the fault flag is set to indicate the potential consumable failure;

wherein the time period comprises about 1.5 milliseconds;

the tolerance threshold comprises a current threshold of about 1.0A if an output current is less than about 45A, a current threshold of about 1.25A if an output current is between about 45A and about 75A, or a current threshold of about 1.5A if an output current is greater than about 75A; and the tolerance threshold comprises a voltage threshold of about 3V.

* * * * *

UNITED STATES PATENT AND TRADEMARK OFFICE
CERTIFICATE OF CORRECTION

PATENT NO. : 10,039,178 B2
APPLICATION NO. : 13/183907
DATED : July 31, 2018
INVENTOR(S) : Liu et al.

Page 1 of 1

It is certified that error appears in the above-identified patent and that said Letters Patent is hereby corrected as shown below:

On the Title Page

Under Inventors section, for the inventor "Zhang Yu" should read --Yu Zhang--.

Signed and Sealed this
Tenth Day of September, 2019

Andrei Iancu
*Director of the United States Patent and Trademark Office*